United States Patent
Hamilton, II et al.

(10) Patent No.: US 10,614,405 B2
(45) Date of Patent: Apr. 7, 2020

(54) EQUIPMENT STOPPAGE AND REPORTING INAPPROPRIATE USAGE

(71) Applicant: International Business Machines Corporation, Armonk, NY (US)

(72) Inventors: Rick A. Hamilton, II, Charlottesville, VA (US); Agueda Martinez Hernandez Magro, Zapopan (MX); Jose Roberto Mosqueda Mejia, Puruandiro (MX); Victor Adrian Sosa Herrera, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 15/429,758

(22) Filed: Feb. 10, 2017

(65) Prior Publication Data
US 2018/0232679 A1  Aug. 16, 2018

(51) Int. Cl.
*G06Q 10/06* (2012.01)
*G05B 15/02* (2006.01)

(52) U.S. Cl.
CPC .............. *G06Q 10/06398* (2013.01)

(58) Field of Classification Search
CPC ......... G06F 16/1734; G06F 2221/0775; H04L 67/22; H04L 63/1433; G05B 15/02
USPC ....................................................... 700/111
See application file for complete search history.

(56) References Cited

U.S. PATENT DOCUMENTS

| | | | |
|---|---|---|---|
| 8,868,242 B2 | 10/2014 | Loutfi | |
| 8,972,067 B2 | 3/2015 | Holt et al. | |
| 9,031,892 B2 | 5/2015 | Martin et al. | |
| 2005/0066784 A1 | 3/2005 | Gass | |
| 2008/0189142 A1 | 8/2008 | Brown et al. | |
| 2010/0214094 A1* | 8/2010 | Givens | B66C 13/44 340/539.17 |
| 2014/0335480 A1 | 11/2014 | Asenjo et al. | |

FOREIGN PATENT DOCUMENTS

| | | |
|---|---|---|
| CN | 101741682 A1 | 6/2010 |
| WO | 2014124273 A1 | 8/2014 |

OTHER PUBLICATIONS

"IBM Opens Watson IoT Global Headquarters, Extends Power of Cognitive Computing to a Connected World", retrieved from https://www-03.ibm.com/press/us/en/pressrelease/48443.wss; Dec. 2015.
"Employer-Reported Workplace Injuries and Illnesses—2014", Bureau of Labor Statistics, U.S. Department of Labor; Oct. 2015.
"Accidents at work statistics", Statistics Explained (http://ec.europa.eu/eurostat/statistics-explained/); Sep. 2016.

* cited by examiner

*Primary Examiner* — Michael J Brown
(74) *Attorney, Agent, or Firm* — Brown & Michaels, PC; Nicholas Bowman

(57) ABSTRACT

Managing misuse of machinery by an operator is disclosed. A system learns a set of safety conditions which are associated with tasks completed by an operator using machinery. Inappropriate usage of the machinery can be identified and the machinery can be remotely shut down and reports of the inappropriate usage of the machinery can be sent to a responsible party.

17 Claims, 5 Drawing Sheets

EQUIPMENT STOPPAGE AND REPORTING INAPPROPRIATE USAGE

BACKGROUND

The present invention relates to equipment safety, and more specifically to equipment stoppage and reporting of inappropriate or unsafe use of equipment.

In manufacturing and/or construction industries, where complex and dangerous machinery or equipment is used, employers may ensure all their staff gets properly trained, as inappropriate usage of one of those pieces of machinery may hurt an employee causing injury. Injuries can affect an employee's ability to work for some days, resulting in a disability or, in the worst case, cause the death of the employee.

Currently there are tools for specific usage of machinery and the manufacturer provides instructions to users on how the user should properly use the device.

However, users may have not paid attention to the training, are distracted when using the machinery, or simply use the machinery in improper ways out of negligence.

While companies or employers establish rules and policies to generate a safe workplace, even with the best practices in place, workplace accidents still happen. Statistics show that the index of accidents has been improving over the years, given the efforts of companies and government organizations or associations. However, even with the best training, an employee may be distracted and improperly use machinery.

Furthermore, it is recognized that beyond national or regional laws governing workplace safety, many companies or job foremen will have their own, unique ideas on workplace safety.

Some machinery has mechanisms that force a device to stop. However, the user can turn the machine on again and continue working after a force stop. If the user again engages in inappropriate usage, the machinery will stop again and this can continue happening, affecting productivity or eventually causing damage to the machinery or the user.

SUMMARY

According to one embodiment of the present invention, a method of managing misuse of machinery by an operator is disclosed. The method comprising the steps of: a computer receiving data regarding an operator of the machinery prior to use of the machinery by the operator; the computer recording movements of at least part of the machinery via sensors of the machinery in real time during use of the machinery by the operator; the computer analyzing movements of the machinery recorded via the sensors of the machinery to determine whether usage of the machinery is misuse of the machinery by the operator through comparison of the movements to an established safety configuration for the machinery; the computer sending an alert to the machinery to alter the use of the machinery in real time; and the computer sending a notification to at least a supervisor of the operator regarding misuse of the machinery by the operator.

According to another embodiment of the present invention, a computer program product for managing misuse of machinery by an operator is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: receiving, by the computer, data regarding an operator of the machinery prior to use of the machinery by the operator; recording, by the computer, movements of at least part of the machinery via sensors of the machinery in real time during use of the machinery by the operator; analyzing, by the computer, movements of the machinery recorded via the sensors of the machinery to determine whether usage of the machinery is misuse of the machinery by the operator through comparison of the movements to an established safety configuration for the machinery; sending, by the computer, an alert to the machinery to alter the use of the machinery in real time; and sending, by the computer, a notification to at least a supervisor of the operator regarding misuse of the machinery by the operator.

According to another embodiment of the present invention, a computer system for managing misuse of machinery by an operator is disclosed. The computer system comprising a computer comprising at least one processor, one or more memories, one or more computer readable storage media having program instructions executable by the computer to perform the program instructions. The program instructions comprising: receiving, by the computer, data regarding an operator of the machinery prior to use of the machinery by the operator; recording, by the computer, movements of at least part of the machinery via sensors of the machinery in real time during use of the machinery by the operator; analyzing, by the computer, movements of the machinery recorded via the sensors of the machinery to determine whether usage of the machinery is misuse of the machinery by the operator through comparison of the movements to an established safety configuration for the machinery; sending, by the computer, an alert to the machinery to alter the use of the machinery in real time; and sending, by the computer, a notification to at least a supervisor of the operator regarding misuse of the machinery by the operator.

DETAILED DESCRIPTION

Figure 1:
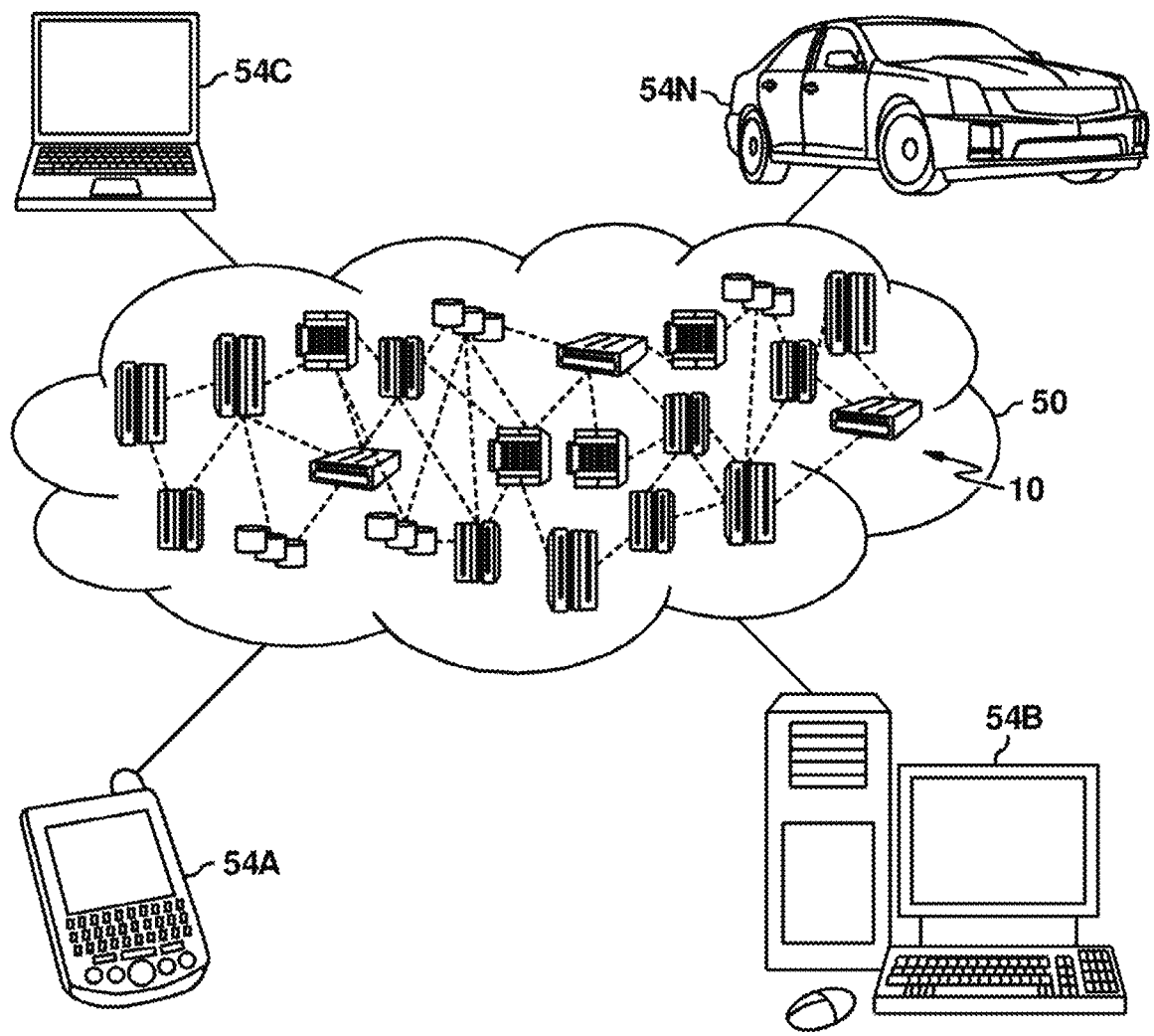
FIG. 1 depicts a cloud computing node according to an embodiment of the present invention.

In an embodiment of the present invention, it is recognized that the system learns a set of safety conditions which are associated with tasks completed by an operator or user using the piece of equipment, machinery or tool. A method of the present invention identifies the inappropriate usage of the machinery, turns the machinery off, and reports the inappropriate action to a responsible party and adjusts settings, if needed. Therefore, the present invention provides a technically-enabled method for tools and equipment to conform to the individual standards, such that each company or foreman can establish guidelines over-and-above legal requirements, increasing the safety associated with an operator using a piece of machinery.

In the present application, the terms "machinery", "tool", and "equipment" are used interchangeably. The term machinery refers to any machine or machine parts or tool used to craft or manufacture an item.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. One of the cloud computing nodes 10 may be the employer's cloud 100 discussed in further detail below. The cloud computing nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
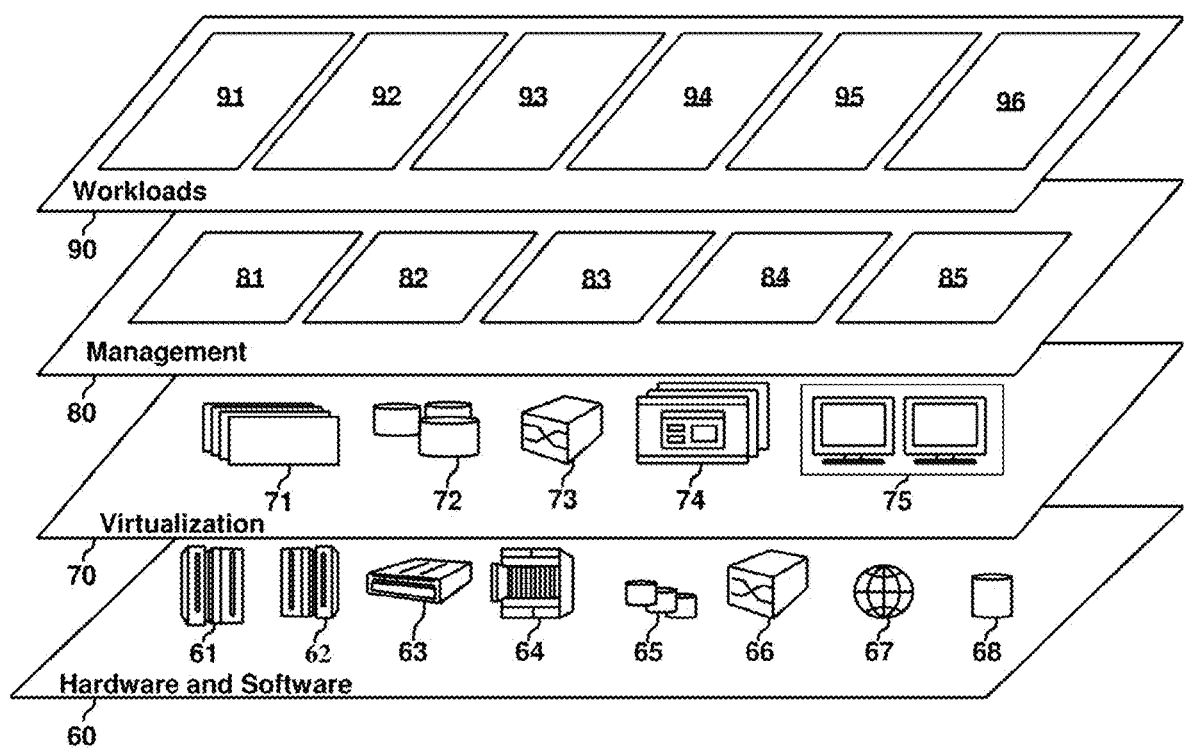
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and equipment safety 96.

Figure 3:
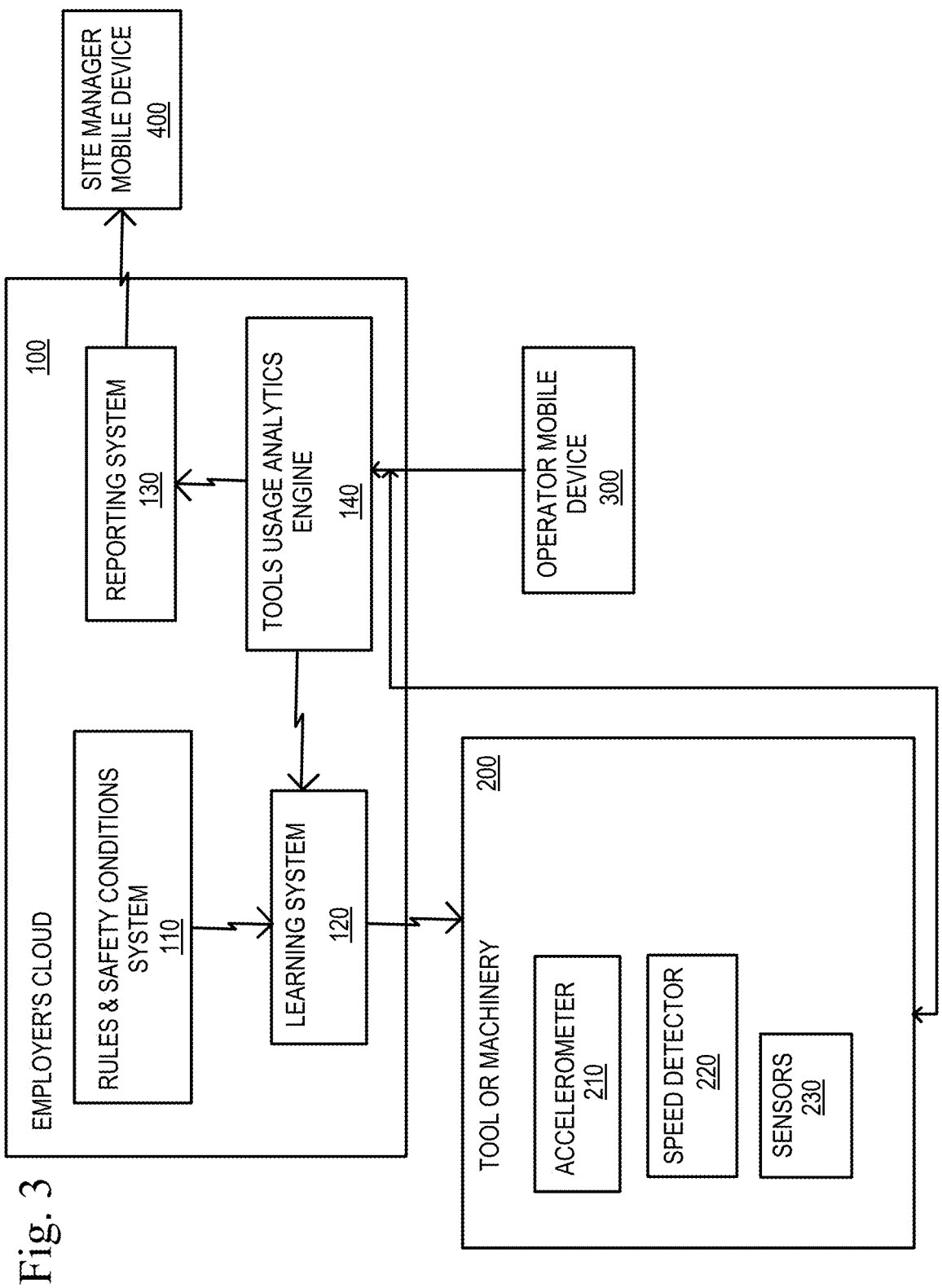
FIG. 3 shows an exemplary embodiment of a system diagram.

FIG. 3 shows an exemplary embodiment of a system diagram. The system 101 has an employer's or company cloud node 100. The employer's cloud node 100 may be one of the cloud computing nodes 10 of FIG. 1. The employer's cloud node 100 may contain different applications and services running in a public, private or hybrid cloud. The employer's cloud node 100 preferably includes a Rules and Safety Conditions System 110, a Learning System 120, a Tool Usage Analytics Engine 140 and a Reporting System 130. The Rules and Safety Conditions System 110 preferably provides input to the Learning System 120. The Tool Usage Analytics Engine 140 is connected to the Reporting System 130 and provides input to the Learning System 120.

The Rules and Safety Conditions System 110 allows a site manager to establish a set of rules or safety conditions, applicable to the company. These rules are established as a set of acceptable parameters for specific variables depending on each tool or machinery. For example: Maximum speed=X where X is an appropriate value according to safety conditions.

The Learning System 120 learns the adequate set of rules specified by the site manager for the Rules and Safety Conditions System 110 and from the analytics obtained from the Tools Usage Analytics Engine 140. The Learning System 120 also provides the approved configuration to the tool or machinery 200. The Learning System 120 may be comprised of a neural network. For example, a deep learning neural network. The deep learning neural network uses a cascade of many layers of nonlinear processing units for feature extraction and transformation. Each successive layer uses the output from the previous layer as input. The algorithms may be supervised or unsupervised and applications include pattern analysis (unsupervised) and classification (supervised).

The deep learning neural network is based on the (unsupervised) learning of multiple levels of features or representations of the data. Higher level features are derived from lower level features to form a hierarchical representation. The deep learning neural network is part of the broader machine learning field of learning representations of data. Furthermore, the deep learning neural network learns multiple levels of representations that correspond to different levels of abstraction; the levels form a hierarchy of concepts.

The deep learning neural network identifies information hierarchies and understands relationships between people, places and machinery.

For example, the deep learning neural network could find that when an employee is a new user (i.e. because it is the first time using the machinery), and apply the configuration rules for this user based on his skill level, i.e. the max speed allowed should be less than the max speed for experienced users since the probability of an accident is higher.

The Reporting System 130 generates reports of the usage of the tool with information obtained from the Tools Usage Analytics Engine 140. When inappropriate usage is detected, the Site Manager is notified by the Reporting System 130, for example, by sending a message in a specified form to the Site Manager via a device 400. The device may be a personal computer, a tablet or a mobile device 400.

The Tool Usage Analytics Engine 140 receives usage information from the machinery 200 to detect improper usage and can send a signal to turn the machinery off or inactivate a specific portion of the machinery, for example a spinning blade, when reaching a limit which is inappropriate.

The Tool Usage Analytics Engine 140 also receives information regarding the identity of the operator of the machinery either from input generated by the operator provided directly to the machinery 200 or from an operator's mobile device 300. For example, a near field communication mechanism of the operator's mobile device 300 can communicate information regarding the identity of the operator and the tool or machinery 200 can provide the identity of the operator of the tool to the Tools Usage Analytics Engine 140.

The employer's cloud node 101 is connected through a network to individual tools or machinery present in the company. The individual machinery present in the company also provide input to the Tools Usage Analytics Engine 140 for analysis and monitoring. Each of the individual tools or machinery preferably have sensors 210-230 that provide measurements as to the usage of the machinery and associated safety practices. Additionally sensors may be present for specific features that can both provide measurements regarding safety and limit a function of the tool or machinery, for example an accelerometer 210 or speed detector 220. The sensors 210-230 can detect the actual values of motion, speed, etc., and will provide information to the Tools Usage Analytics Engine 140 for analysis and detection of improper usage.

Figure 4:
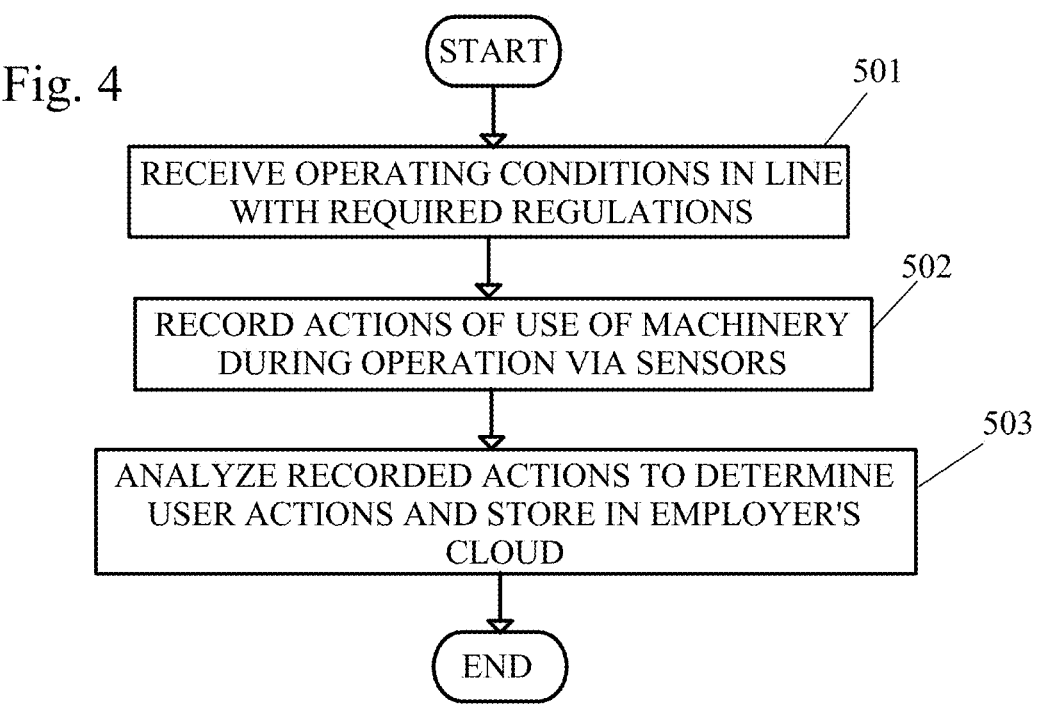
FIG. 4 shows a flow diagram of a method of registering and training safety practices for a piece of equipment.

It should be noted that prior to FIG. 4, the tool or machinery 200 needs to be registered with the employer's cloud system 100 by connecting the tool to a network in connection with the employer's cloud system 100. The employer's cloud system 100 can either receive unique identifiers from the machinery itself via the network, or unique identifiers can be manually provided to the employer's cloud system 100 by an administrator or site manager. The identification may include, but is not limited to, a brand, type of tool, a serial number, and a location within the company. The unique identifiers may be stored in the employer's cloud system 100.

FIG. 4 shows a flow diagram of a method of registering and training safety practices for a piece of equipment.

In a first step, configuration of operating conditions of a specific piece of machinery or a group of the same machines in accordance with safety protocols is received by the Rules and Safety Conditions System 110 (step 501). The safety protocols are in accordance with government regulations and may include additional safety protocols designated as required by the company. The operating conditions may include a speed in which the machinery is run, closeness to humans, motion detected by accelerometers, a temperature in which the machinery may be set to and/or a time in which the machinery can be operated for at a certain condition, an amount of time the machinery can be operated continuously and other factors.

The actions of a user, for example a site manager or other individual aware of executing proper usage of the machinery in accordance with all designated safety protocols, is recorded using the machinery (step 502). Measurements are taken during the actions recorded via the sensors of the machinery. The actions preferably include tasks which will be executed by the machinery during normal use by employees of the company. The acceptable condition may include, but is not limited to, measurements of speed of elements of the machinery, duration of operation of the machinery, nearness to human beings of the machinery, motion of elements of the machinery or the machinery itself detected through accelerometers of the machinery. The recordation of actions may be for a preset amount of time or may be manually ended by the site manager.

The recorded actions and associated measurements captured via the sensors of the machinery are analyzed to determine user or operator actions with specific operations of the machinery and configured safety protocols and are stored in the employer's cloud 110 to generate an established safety machinery configuration (step 503) and the method ends. More specifically, the Learning System 120 analyzes the recorded actions and correlates the recorded, determined operator actions with configured safety protocols of the Rules and Safety Conditions System 110 via a neural network to determine whether there is a misuse of the machinery which results in violation of the safety protocols.

Figure 5:
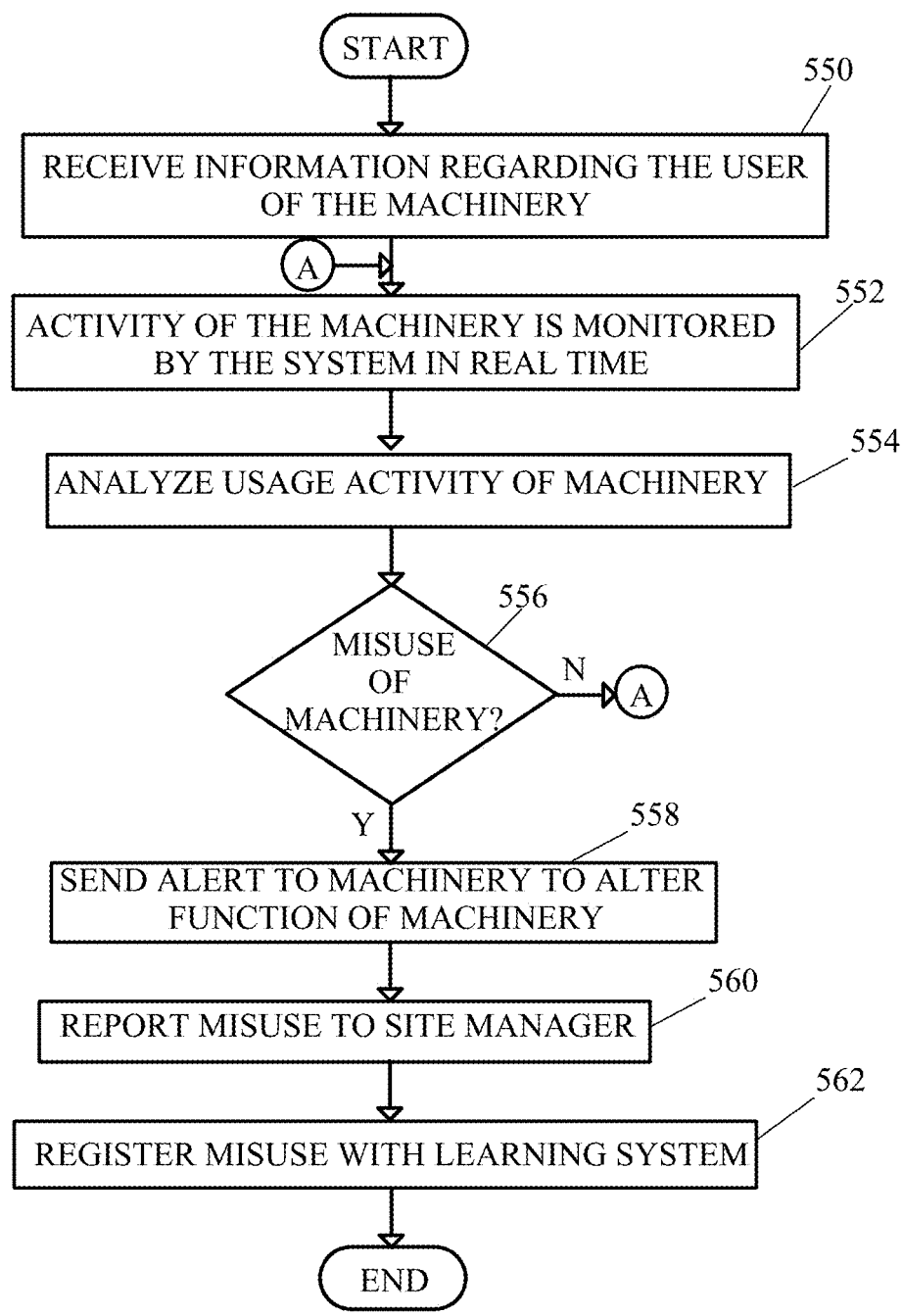
FIG. 5 shows a flow diagram of a method of reducing and reporting inappropriate usage of the piece of equipment by an operator or a user.

FIG. 5 shows a flow diagram of a method of reducing and reporting inappropriate usage of the piece of equipment by an operator.

In a first step, the system receives information regarding the operator of the machinery (step 550). The information may be transmitted by the operator's mobile device 300 or by input provided by the operator to the machinery prior to being operated.

The activity of the machinery being used is monitored and recorded by the system in real time (step 552), for example by the Tool Usage Analytics Engine 140. The activity is monitored through data received from the sensors 220, 230 and accelerometer 210 of the machinery providing measurements regarding the machinery's movement within or by the machinery.

The activity of the machinery being used is analyzed to determine whether safety protocols are being violated or misuse of the machinery is occurring by the operator of the machinery (step 554).

If the machinery is being misused (step 556), as determined by measurements from sensors of the machinery meeting a predetermined threshold set by the employer, an alert is sent to the machinery, altering the function of the machinery (step 558) and a report of the misuse is sent to the site manager (step 560). The alert may be a signal to turn the machinery off completely or alter an element of the machinery to reduce the misuse or safety risk to the operator and/or other users in the vicinity of the machinery. One example reduces the speed a cutting blade is operated at after misuse is determined. For example, this may occur when a operator is operating the blade 20% faster than allowed. The alert sent may slow the speed of the blade by 20%, such that measurements captured through the sensors are within a predetermined threshold. The report of the misuse may be sent to a mobile device 400 of the site manager. The report of the misuse may include information such as the machinery used, time of the misuse, operator of the machinery at the time of misuse and the safety protocol violated. The site manager preferably uses the alert to discuss the misuse of the machinery and violation of the safety protocol with the operator and determine the cause of the misuse of the machinery.

The misuse is registered with the Learning System 120 (step 562) and the method ends. The cause of the misuse, as determined by the site manager, may be added as additional information and used by the Learning System 120 to suggest actions, such as adapting the configuration within the Rules and Safety Conditions System 110 to prevent further misuse.

If a misuse of the machinery by the operator is not present, the method returns to step 552 of recording and monitoring usage of the machinery by the operator.

The method of FIG. 5 is repeated for each operator identified as using the machinery. Therefore, the method can end abruptly if a new operator is identified as using the machinery. Furthermore, if a misuse of the machinery is determined as occurring, the machinery may be prevented from restarting or operating by the system until a site manager has entered the cause of the misuse of the machinery.

In an alternate embodiment, reporting of the unsafe conditions, including learned unsafe conditions, may be performed by the machinery itself, if the machinery is equipped with a radio frequency signal of sufficient strength. In another embodiment, the machinery may report the unsafe condition to a "tethered" mobile device of the operator of the machinery. When the machinery detects that there is a misuse in the configuration, it could send a message to the site manager mobile device, it could be done using a Bluetooth connection, this imply that the machinery is equipped with a Bluetooth device and the site manager is on a near distance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing misuse of machinery by an operator comprising the steps of:
   a computer receiving data regarding an operator of the machinery prior to use of the machinery by the operator;
   the computer recording movements of at least part of the machinery via sensors of the machinery in real time during use of the machinery by the operator;
   the computer analyzing movements of the machinery recorded via the sensors of the machinery to determine whether usage of the machinery is misuse of the machinery by the operator through comparison of the movements to an established safety configuration for the machinery;
   the computer sending an alert to the machinery to alter the use of the machinery in real time;

the computer sending a notification to at least a supervisor of the operator regarding misuse of the machinery by the operator;

the computer registering the misuse of the machinery as an incident in a tracking repository associated with an owner of the machinery; and the computer initiating misuse cause determination for the incident.

2. The method of claim 1, comprising prior to an operator using the machinery for a first use:

the computer registering the machinery in a cloud environment associated with an owner of the machinery and assigning the machinery a unique identifier;

the computer recording actions of an authorized operator in compliance with safety regulations and protocols using the machinery via sensors of the machinery; and the computer analyzing the recorded actions to determine a set of sensor measurements indicative of safe operating conditions in compliance with safety regulations to determine the established safety configuration for the machinery.

3. The method of claim 2, wherein the machinery configuration comprises: metrics of speed of an element of the machinery, duration of operation of the machinery, nearness of the machinery to human beings, and motion of at least an element of the machinery.

4. The method of claim 1, wherein the alert shuts down the machinery for further use by the operator.

5. The method of claim 1, wherein the alert alters at least one element of the machinery during use of the machinery in real time.

6. The method of claim 1, wherein determining the cause of the misuse of the machinery comprises the steps of:

the computer receiving input from the supervisor regarding a cause associated with the incident in the tracking repository; and the computer analyzing information associated with occurrences of incidents associated with the machinery in the tracking repository to generate alterations to the established safety configuration for the machinery.

7. A computer program product for managing misuse of machinery by an operator, a computer comprising at least one processor, one or more memories, one or more computer readable storage media, the computer program product comprising a computer readable storage medium having program instructions embodied therewith, the program instructions executable by the computer to perform a method comprising:

receiving, by the computer, data regarding an operator of the machinery prior to use of the machinery by the operator;

recording, by the computer, movements of at least part of the machinery via sensors of the machinery in real time during use of the machinery by the operator;

analyzing, by the computer, movements of the machinery recorded via the sensors of the machinery to determine whether usage of the machinery is misuse of the machinery by the operator through comparison of the movements to an established safety configuration for the machinery;

sending, by the computer, an alert to the machinery to alter the use of the machinery in real time;

sending, by the computer, a notification to at least a supervisor of the operator regarding misuse of the machinery by the operator;

registering, by the computer, the misuse of the machinery as an incident in a tracking repository associated with an owner of the machinery; and initiating, by the computer, misuse cause determination for the incident.

8. The computer program product of claim 7, comprising prior to an operator using the machinery for a first use:

registering, by the computer, the machinery in a cloud environment associated with an owner of the machinery and assigning the machinery a unique identifier;

recording, by the computer, actions of an authorized operator in compliance with safety regulations and protocols using the machinery via sensors of the machinery; and analyzing, by the computer, the recorded actions to determine a set of sensor measurements indicative of safe operating conditions in compliance with safety regulations to determine the established safety configuration for the machinery.

9. The computer program product of claim 8, wherein the machinery configuration comprises: metrics of speed of an element of the machinery, duration of operation of the machinery, nearness of the machinery to human beings, and motion of at least an element of the machinery.

10. The computer program product of claim 7, wherein the alert shuts down the machinery for further use by the operator.

11. The computer program product of claim 7, wherein the alert alters at least one element of the machinery during use of the machinery in real time.

12. The computer program product of claim 7, wherein determining the cause of the misuse of the machinery comprises the program instructions of:

receiving, by the computer, input from the supervisor regarding a cause associated with the incident in the tracking repository; and analyzing, by the computer, information associated with occurrences of incidents associated with the machinery in the tracking repository to generate alterations to the established safety configuration for the machinery.

13. A computer system for managing misuse of machinery by an operator the computer system comprising a computer comprising at least one processor, one or more memories, one or more computer readable storage media having program instructions executable by the computer to perform the program instructions comprising:

receiving, by the computer, data regarding an operator of the machinery prior to use of the machinery by the operator;

recording, by the computer, movements of at least part of the machinery via sensors of the machinery in real time during use of the machinery by the operator;

analyzing, by the computer, movements of the machinery recorded via the sensors of the machinery to determine whether usage of the machinery is misuse of the machinery by the operator through comparison of the movements to an established safety configuration for the machinery;

sending, by the computer, an alert to the machinery to alter the use of the machinery in real time;

sending, by the computer, a notification to at least a supervisor of the operator regarding misuse of the machinery by the operator;

registering, by the computer, the misuse of the machinery as an incident in a tracking repository associated with an owner of the machinery; and initiating, by the computer, misuse cause determination for the incident.

14. The computer system of claim 13, comprising prior to an operator using the machinery for a first use:
registering, by the computer, the machinery in a cloud environment associated with an owner of the machinery and assigning the machinery a unique identifier;
recording, by the computer, actions of an authorized operator in compliance with safety regulations and protocols using the machinery via sensors of the machinery; and
analyzing, by the computer, the recorded actions to determine a set of sensor measurements indicative of safe operating conditions in compliance with safety regulations to determine the established safety configuration for the machinery.

15. The computer system of claim 14, wherein the machinery configuration comprises: metrics of speed of an element of the machinery, duration of operation of the machinery, nearness of the machinery to human beings, and motion of at least an element of the machinery.

16. The computer system of claim 13, wherein the alert shuts down the machinery for further use by the operator.

17. The computer system of claim 13, wherein determining the cause of the misuse of the machinery comprises the steps of:
receiving, by the computer, input from the supervisor regarding a cause associated with the incident in the tracking repository; and
analyzing, by the computer, information associated with occurrences of incidents associated with the machinery in the tracking repository to generate alterations to the established safety configuration for the machinery.

* * * * *